Figure 1:
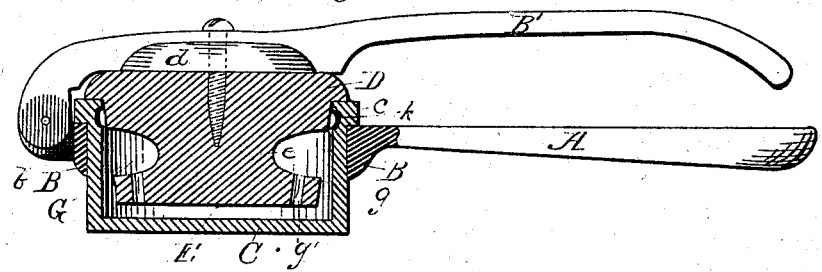

(Model.)

T. C. NEWMAN.
FRUIT SQUEEZER.

No. 283,014.        Patented Aug. 14, 1883.

Witnesses:
Frank D. Thomason
S. S. Schoff

Inventor:
Thomas C. Newman
By James H. Coyne
Atty

N. PETERS, Photo-Lithographer, Washington, D. C.

UNITED STATES PATENT OFFICE.

THOMAS C. NEWMAN, OF CHICAGO, ILLINOIS.

FRUIT-SQUEEZER.

SPECIFICATION forming part of Letters Patent No. 283,014, dated August 14, 1883.

Application filed October 13, 1882. (Model.)

*To all whom it may concern:*

Be it known that I, THOMAS C. NEWMAN, of Chicago, in the county of Cook and State of Illinois, have invented certain new and useful Improvements in Lemon-Squeezers; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to furnish a lemon-squeezer which will thoroughly squeeze the lemon, retain the juice, allow the same to be poured off from the lemon-receptacle without exposing that in the same to the air, and in which the juice will not be affected by corrosion. This I accomplish by making both the presser-foot which depends from the lid closing the lemon-receptacle and said receptacle of wood, and providing the receptacle with means for pouring off the lemon-juice, which may be accumulated therein, without opening the lid, substantially as hereinafter described, and as illustrated in the drawings.

Figure 2:
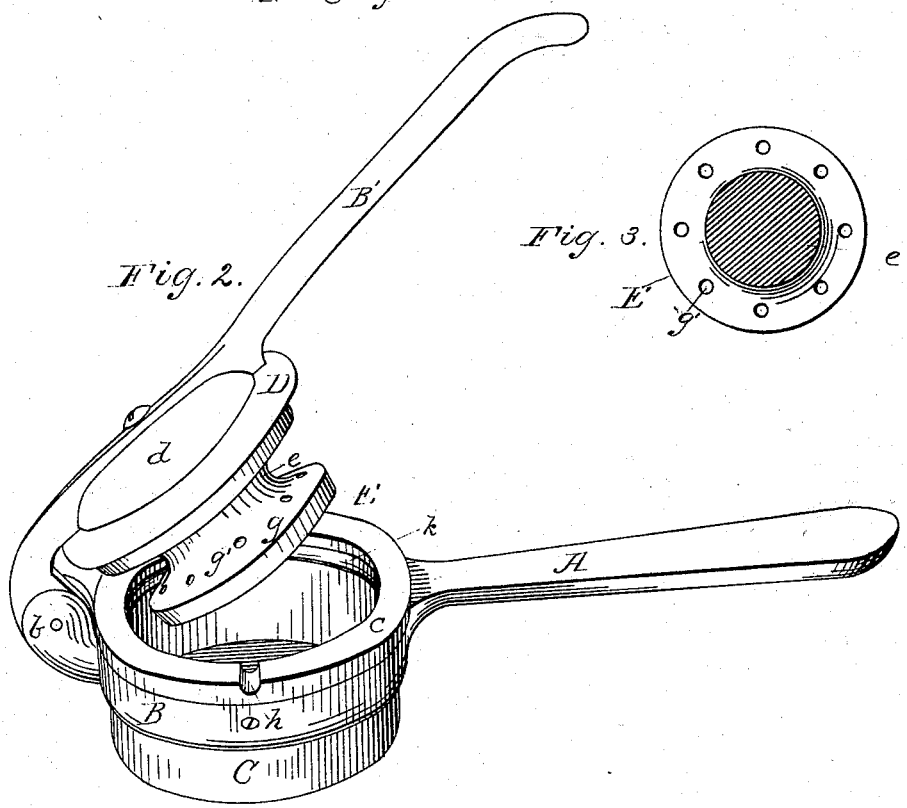
Figure 3:
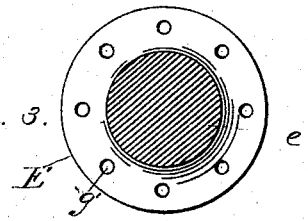

Figure 1 is a vertical longitudinal section. Fig. 2 is a perspective view; and Fig. 3 is a detail, showing the arrangement of the series of perforations in the flange of the presser-foot.

In the drawings, A represents the lower handle, which merges into a circular band, B, surrounding the lemon-cup or receptacle C immediately under the flange c encircling the mouth of the same. It has projecting in a direction and from a position diametrically opposite said handle two lugs, b, between which is pivoted the downwardly-curved contiguous end of the upper handle, B'. This upper handle pursues a longitudinal course over the lid of the lemon-cup over the lower handle, being shaped and curved so as to afford a comfortable grasp to the hand. Projecting laterally from either side of the upper handle, immediately over the lid, are lobes d, forming a circular plate, the center of which corresponds to that of the lid, the whole of which is adapted to give a greater bearing-surface of that portion of the handle on the lid. The lid D is adapted to cover completely the mouth of the lemon-cup, and has a portion entering said cup. Immediately under the lid is the presser-foot E, connected to the same by a neck, e, which is considerably less in diameter than either the lid or presser-foot, thus giving to the latter a circumferential flange, g, through which is arranged a series of vertical perforations, g'. The diameter of the neck e, being so much less than either that of the lid or foot, creates a sort of chamber, G, in which, when the foot is pressed on a lemon, the juice accumulates.

In the inner circumference of the cup C, immediately under and running parallel with the inner edge of the mouth of said cup, is a circumferential groove, k, semicircular in cross-section, which collects stray drops of lemon-juice and prevents the same from escaping over the rim of the cup and corroding the metal frame. It also serves as a channel to convey the juice thus accumulated to the outlet-channel, which is made deep enough to intersect the same. When it is desired to pour out any of the juice thus accumulated, the device is inclined to one side until the liquid flows from the cup out of the channel h, cut in the upper surface of the flange c of the lemon-cup on a line radiating from the center thereof. The cup, as will be noticed, is made secure in position by screws passing through the band into the same, and the lid is fastened to the upper handle by a screw passing vertically through the circular plate into the center of the same.

The handles and frames for holding the cup and lid of my invention are made of suitable metal; but the cup, lid, and presser-foot, which are brought in contact with the lemon-juice, are preferably made of hard close-grain wood— *e. g.*, lignum-vitæ, black ebony, mahogany, box-wood, &c., which do not affect or are not affected by the citric acid of the lemon.

The lid and presser-foot may be made to snugly fit the inner walls of the cup; but I prefer the construction shown and described as embodying the principle of my machine.

What I claim as new, and desire to secure by Letters Patent, is—

1. In a lemon-squeezer, a presser-foot connected to the lid of the lemon-receptacle and having a circumferential flange and a series of perforations in said flange, the whole adapted to enter the lemon-receptacle, as and for the purpose specified.

2. A lemon-squeezer, the frame of which is made of metal, having a lemon-receptacle, lid, and presser-foot depending from the same, made of wood, said lemon-receptacle having a circumferential groove immediately under and parallel with the inner edge of the mouth of the same, and having an outlet-channel cut laterally in the upper surface of the flanged mouth thereof, as hereinbefore set forth.

3. The combination, in a lemon-squeezer, of the handles A and B', the lemon-receptacle C, having a circumferential groove, K, in its inner surface, and having in the flange encircling the mouth a channel, $h$, with the lid D, the presser-foot E, having a flanged portion, in which is a series of perforations, $g'$, and being connected to said lid by a neck, $e$, substantially as and for the purpose set forth.

In testimony that I claim the foregoing as my own I hereunto affix my signature in presence of two witnesses.

THOMAS C. NEWMAN.

Witnesses:
   JAMES H. COYNE,
   FRANK D. THOMASON.